Patented Apr. 16, 1946

2,398,706

UNITED STATES PATENT OFFICE.

2,398,706

RIBOFLAVIN DERIVATIVES AND PROCESS OF PREPARING THE SAME

Gerhard Julius Haas, New York, N. Y., assignor to Hoffmann-La Roche, Inc., Roche Park, Nutley, N. J., a corporation of New Jersey No Drawing. Application April 27, 1945, Serial No. 590,745

19 Claims. (Cl. 260—211)

This invention relates to new soluble derivatives of riboflavin (vitamin $B_2$) having considerably increased solubility in solvents, such as water, aqueous alcohol, glycerine and the like, and to a process of making them.

It is well known that the therapeutic use of riboflavin in solutions is severely restricted owing to its low solubility in all physiologically acceptable solvents, such as water, aqueous alcohol, glycerine and the like. Attempts have been made to increase the solubility of the riboflavin in these solvents, either by preparing derivatives of riboflavin having groups which increase the solubility, or by adding solubilizers for riboflavin to the solutions. The known derivatives have not proven fully satisfactory for all practical requirements, such as degree of solubility, stability and physiological activity, and the use of solubilizers is apt to have the disadvantage that large amounts of a foreign substance, namely, solubilizer, are required to dissolve relatively small quantities of riboflavin over and above the normal solubility thereof in a given solvent.

I have now discovered that the following derivatives of riboflavin corresponding to the general formula

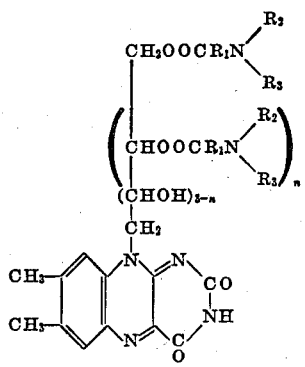

and the salts of these derivatives, wherein $n$ is a number from 0 to 3 inclusive, $R_1$ is a divalent aliphatic radical, and $R_2$ and $R_3$ are hydrogen, alkyl, hydroxyalkyl or aminoalkyl, have exceptionally high solubilities in the aforementioned customary solvents, particularly in water.

My new derivatives can be prepared by esterifying riboflavin with a halogenide of the general formula $X.R_1.COX$ where $R_1$ has the meaning given above and $X$ stands for halogen such as chlorine or bromine, or with halogenated acid anhydrides of the general formula

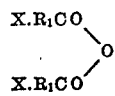

wherein $X$ and $R_1$ have the meanings indicated above. In this way, halogenated derivatives of riboflavin are prepared which may or may not be actually isolated. The number of substituents, designated by the numeral $n$ above, depends on the quantity of the above esterifying agents used. In my preferred modification I use 4 g. equivalents of these esterifying agents for 1 g. equivalent of riboflavin.

These compounds are then reacted with aliphatic amines. In this way, the halogen is displaced and mixed amines of esterified riboflavin are obtained. These amines are extremely soluble, particularly in the form of their salts. These salts may be isolated or directly used in solution. Thus, for instance, the citrate of $B_2$-acetyl-diethylamine is obtained by reacting riboflavin with 4 g. mols of chloracetyl chloride, reacting the condensation product with diethylamine and treating the base with citric acid. I have found that up to 80 mg./cc. of riboflavin can be present in aqueous solutions of this citrate, and to my knowledge this value represents one of the highest solubilities of riboflavin in water thus far achieved. Moreover, such a highly concentrated aqueous solution may be prepared at the low pH values of 3.5 and 4 which are particularly useful for liquid vitamin-complex preparations.

The following examples illustrate my invention:

EXAMPLE 1

*Citrate of diethylaminoacetyl-riboflavin*

50 g. of dry riboflavin were suspended in 100 cc. dry dioxane, and to this suspension 41.5 cc. (62 g.) (4.13 g. mols) chloracetylchloride in 100 cc. dry dioxane were added and the mixture refluxed for 1¾ hours shaking occasionally during this interval. Then all the dioxane was distilled off in vacuo and the residue washed once with ether. At this stage a sample shaken with water should not give an acid reaction, thus showing that all the HCl has been removed. The residue was then treated with excess diethylamine. It went into solution and at the same time diethylamine hydrochloride was precipitated. The diethylamine hydrochloride was filtered off and the filtrate evaporated to dryness in vacuo. The residue was dissolved in acetone. This solution was then added with stirring to a solution of excess citric acid in acetone. The precipitate settled to the bottom as a dark semisolid residue. It was then redissolved in a minimum of methanol, decolorized with charcoal, and reprecipitated with acetone. The substance precipitated as a flocculent precipitate, it was filtered, immediately transferred to the desiccator and finally dried at 1 mm. and 60° for 30 minutes. The resulting compound was a reddish-brown powder decomposing above 118° C. uncorr., giving reddish-brown solutions in water, which fluoresce when more dilute. It is extremely soluble in water; 1 g. is soluble in 3 cc. at room temperature which corresponds to a solubility of 330 mg./cc. by weight or 80 mg./cc. of riboflavin as determined both fluorometrically and microbiologically. The solutions are slightly acid (pH 3.5). The compound is very soluble in ethanol and methanol, very slightly soluble in acetone and insoluble in ether.

Example 2

*Citrate of diethylaminoacetyl-riboflavin*

5 g. of chloracetyl-$B_2$ were dissolved in 15 cc. of diethylamine, and the precipitated diethylamine hydrochloride filtered off. The excess diethylamine was then evaporated off, and the residue dissolved in acetone and precipitated with ether. The precipitated oil was redissolved in acetone and added to a solution of 5 g. of citric acid in acetone. The citrate precipitated out as a sticky mass. It was dried in the desiccator, dissolved in methanol and reprecipitated with acetone. It was similar in properties to the compound obtained in Example 1.

Example 3

*Hydrochloride of diethylaminoacetyl-riboflavin*

10 g. of $B_2$ were esterified with 8.45 cc. (12.6 g., 4.2 mol equivalents) of chloracetyl chloride in dioxane, as described in Example 1.

After distilling off the dioxane, the residue was dissolved in diethylamine, the precipitated diethylamine hydrochloride filtered off and the filtrate evaporated to dryness in high vacuo. The residue was then dissolved in dilute HCl. It may now be adjusted to the pH value, and to the concentration which it is desired to use. Samples containing 5.5 mg./cc. of riboflavin, as determined fluorometrically, did not precipitate on storage for a period of 21 days at 4° C., 25° C., 40° C. or 45° C.

Example 4

*Citrate of (alpha diethylaminopropionyl) - riboflavin*

1 g. of the reaction product of riboflavin with 4 g. mols α-brompropionyl bromide $CH_3CHBrCOBr$ was treated with a mixture of methanol and diethylamine. When the solution was homogeneous, it was evaporated to dryness and the residue dissolved in acetone; this acetone solution was then added to a solution of citric acid in acetone. The citrate precipitated out, and was also very soluble in water just as the product described in Example 1.

Example 5

*Hydrochloride of diethylaminoacetyl-riboflavin*

10 g. of riboflavin were esterified with 8.5 cc. of chloracetyl chloride in dioxane, as described above. The chloroacetyl compound was then dissolved in diethylamine by shaking, the diethylamine hydrochloride formed was filtered off, and the excess diethylamine was distilled off in vacuo. The residue was dissolved in a saturated solution of hydrogen chloride gas in methanol. The hydrochloride of diethylaminoacetyl-riboflavin was then precipitated with acetone as a blackish-brown oily precipitate. It was redissolved in methanol and reprecipitated with acetone as a flocculent reddish-brown hygroscopic precipitate, which decomposes when heated above 155° C. uncorr. in vacuo. It was extremely soluble in water (1 g. in 1 cc.). The solutions were acid (pH about 1.8).

Example 6

*Aminoacetyl-riboflavin*

3 g. of chloracetyl riboflavin were refluxed in 30 cc. of dioxane with 2 cc. of concentrated ammonia solution; after ½ hour refluxing the mixture was evaporated down in volume and so most of the excess ammonia driven off. Then ether was added and the aminoacetyl-riboflavin precipitated. The supernatant liquid was removed by decantation, then methanol was added to the precipitate. The main portion went into solution. After filtering off the insoluble portion, the aminoacetyl-riboflavin was precipitated with ether. A flocculent precipitate very soluble in water resulted.

What I claim is:

1. Riboflavin derivatives selected from the group consisting of those corresponding to the following general formula, and of their salts

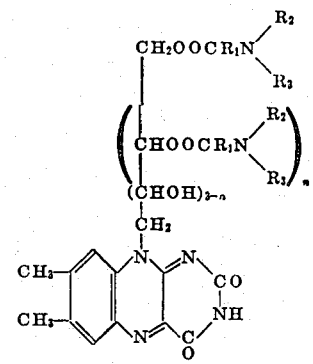

wherein $n$ is a number from 0 to 3 inclusive, $R_1$ is a divalent lower aliphatic radical, and $R_2$ and $R_3$ are selected from the group consisting of hydrogen and ethyl.

2. Condensation products selected from the group consisting of those of lower halogenalkyl esters of riboflavin with amines, and of their salts.

3. Condensation products selected from the group consisting of those of lower halogenalkyl esters of riboflavin with aliphatic amines, and of their salts.

4. Condensation products selected from the group consisting of those of lower chloroalkyl esters of riboflavin with aliphatic amines, and of their salts.

5. Condensation products selected from the group consisting of those of lower bromoalkyl esters of riboflavin with aliphatic amines, and of their salts.

6. Condensation products selected from the group consisting of those of lower halogenalkyl esters of riboflavin with diethylamine, and of their salts.

7. Condensation products selected from the group consisting of those of lower halogenalkyl esters of riboflavin with a compound of the general formula

wherein $R_2$ and $R_3$ are selected from the group consisting of hydrogen and ethyl and of their salts.

8. Riboflavin derivatives selected from the group consisting of those corresponding to the following general formula, and of their salts

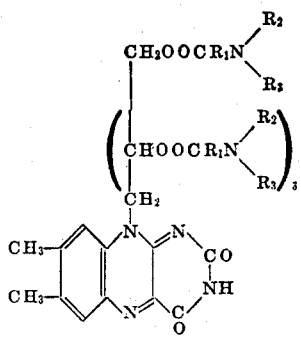

wherein $R_1$ is a divalent lower aliphatic radical and $R_2$ and $R_3$ are selected from the group consisting of hydrogen and ethyl.

9. Process for making soluble derivatives of riboflavin which comprises esterifying riboflavin with an esterifying agent selected from the group consisting of halogenated lower fatty acid halogenides and halogenated lower fatty acid anhydrides, and reacting the resulting ester with a compound corresponding to the general formula

wherein $R_2$ and $R_3$ are selected from the group consisting of hydrogen and ethyl.

10. Process for making soluble derivatives of riboflavin which comprise esterifying riboflavin with a halogenide of the general formula

wherein $R_1$ is a divalent lower aliphatic radical and X stands for halogen, and reacting the resulting ester with an aliphatic amine.

11. Process for making soluble derivatives of riboflavin which comprises esterifying riboflavin with a chloride of the general formula $Cl.R_1.COCl$, wherein $R_1$ is a divalent lower aliphatic radical, and reacting the resulting ester with an aliphatic amine.

12. Process for making soluble derivatives of riboflavin which comprises esterifying riboflavin with a bromide of the general formula

wherein $R_1$ is a divalent lower aliphatic radical, and reacting the resulting ester with an aliphatic amine.

13. Process for making soluble derivatives of riboflavin which comprises esterifying riboflavin with an esterifying agent selected from the group consisting of halogenated lower fatty acid halogenides and halogenated lower fatty acid anhydrides, and reacting the resulting ester with diethylamine.

14. Process for making citrate of diethylaminoacetyl-riboflavin which comprises esterifying 1 mol of riboflavin with slightly more than 4 mols of chloracetyl chloride in dioxane, removing the dioxane, treating the residue with an excess of diethylamine, filtering off the precipitated diethylamine hydrochloride, evaporating the filtrate to dryness, and reacting the residue in acetone solution with an excess of citric acid.

15. Process for making hydrochloride of diethylaminoacetyl-riboflavin which comprises esterifying 1 mol of riboflavin with slightly more than 4 mols of chloracetyl chloride in dioxane, removing the dioxane, treating the residue with an excess of diethylamine, filtering off the precipitated diethylamine hydrochloride, evaporating the filtrate to dryness, dissolving the residue in a saturated solution of hydrogen chloride in methanol, and precipitating the hydrochloride of diethylaminoacetyl-riboflavin with acetone.

16. Process for making aminoacetyl-riboflavin which comprises esterifying 1 mol of riboflavin with slightly more than 4 mols of chloracetyl chloride in dioxane, distilling off the dioxane and recrystallizing the resulting residue from methanol, whereby a fine yellow crystalline powder was isolated, and refluxing said powder in dioxane with concentrated ammonia solution, driving off the excess ammonia from the solution and precipitating the aminoacetyl-riboflavin from the solution by addition of ether.

17. Citrate of diethylaminoacetyl-riboflavin.

18. Hydrochloride of diethylaminoacetyl-riboflavin.

19. Aminoacetyl-riboflavin.

GERHARD JULIUS HAAS.